Sept. 18, 1951  J. D. SUMMERS  2,568,307
FLUID GOVERNOR

Filed Aug. 2, 1949  3 Sheets-Sheet 1

INVENTOR
JOHN D. SUMMERS
By Emory L. Groff
Atty

Sept. 18, 1951  J. D. SUMMERS  2,568,307
FLUID GOVERNOR
Filed Aug. 2, 1949  3 Sheets-Sheet 2
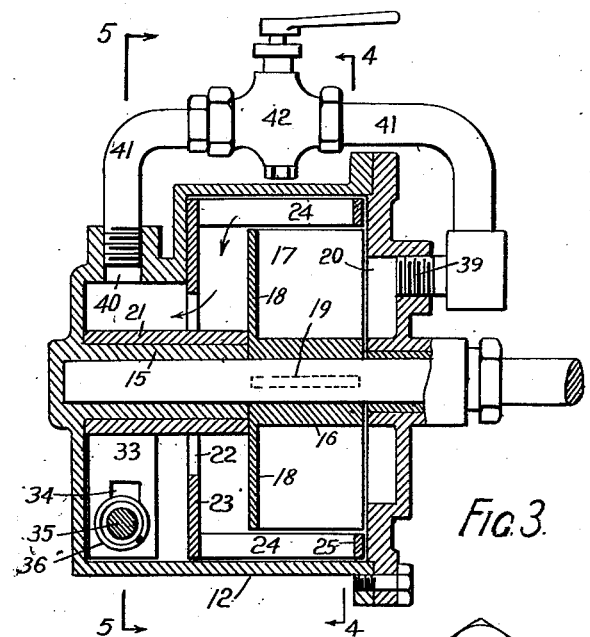
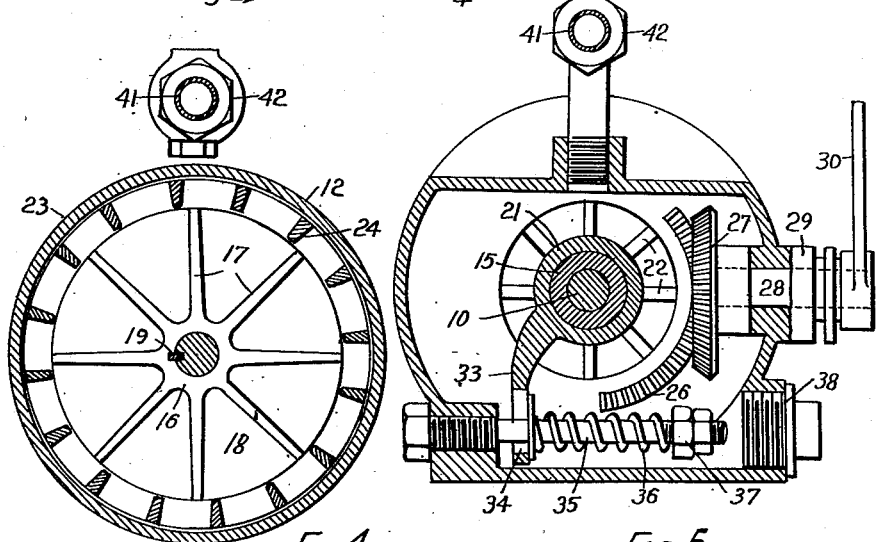
INVENTOR
JOHN D. SUMMERS
By Emory L. Groff
Atty Sept. 18, 1951    J. D. SUMMERS    2,568,307
FLUID GOVERNOR Filed Aug. 2, 1949    3 Sheets-Sheet 3

INVENTOR

JOHN D. SUMMERS
BY Emory L. Groff
Atty

Patented Sept. 18, 1951

2,568,307

UNITED STATES PATENT OFFICE 2,568,307

FLUID GOVERNOR

John Daniel Summers, Randwick, Sydney,
New South Wales, Australia

Application August 2, 1949, Serial No. 108,152
In Australia August 17, 1948

1 Claim. (Cl. 264—14)

This invention has been devised to provide a fluid governor characterised in that: (a) the force or velocity of a fluid created by a driving rotating body will, when a predetermined force or velocity is exceeded, act upon a driven rotatable body—driven by said fluid—and said driven rotatable body will actuate control means which in turn control the motive means of the driving rotating body to prevent the speed thereof exceeding a predetermined rate; (b) when the force or velocity of the fluid falls below a predetermined degree the said driven rotatable body will be actuated by other forces to actuate said control means whereby the said motive means is regulated to increase the speed of the said driving rotating body.

In one embodiment of the invention a drive shaft, which may be a part of the driving body, or a shaft connected to said body has a fluid driving impeller thereon with a stationary casing surrounding said impeller and surrounding a driven impeller rotatably free on said drive shaft adapted to be driven by the fluid activated by said driving impeller. There is a fluid inlet to the casing in juxtaposition to the driving impeller inlet and an outlet from the casing in juxtaposition to the driven impeller outlet. The inlet and outlet are connected outside the casing and there is a control valve in the connecting part. The impellers are so constructed and arranged that fluid activated by the driving impeller acts upon the driven impeller and tends to rotate it.

The driven impeller has an arm thereon connected to an adjustable torque spring. The spring restricts the rotation of the driven impeller.

There is a quadrant gear on the driven impeller which is engaged by a pinion on a pinion shaft having a mechanical or electrical connection to motive means control means whereby the speed of the motive means actuating the shaft is controlled by the operation of the driven impeller. The control valve is used to control the flow of fluid and consequently the operation of the governor.

Figure 1:
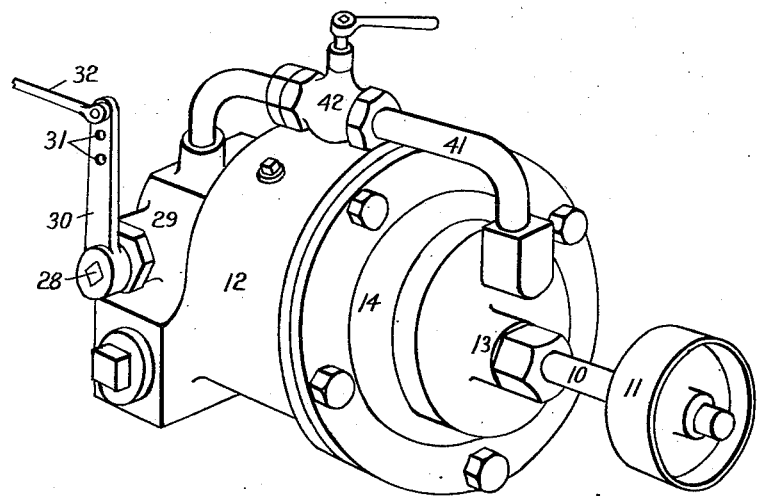
Figure 2:
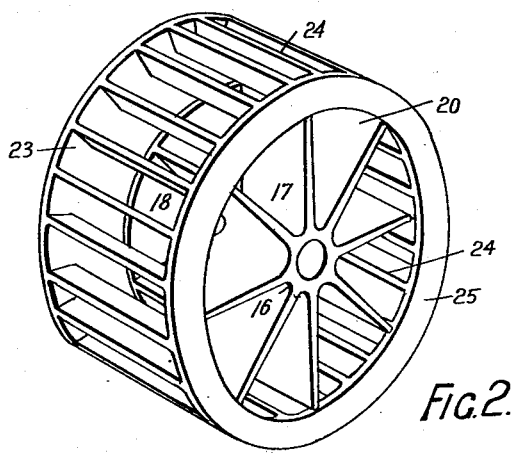
Figure 6:
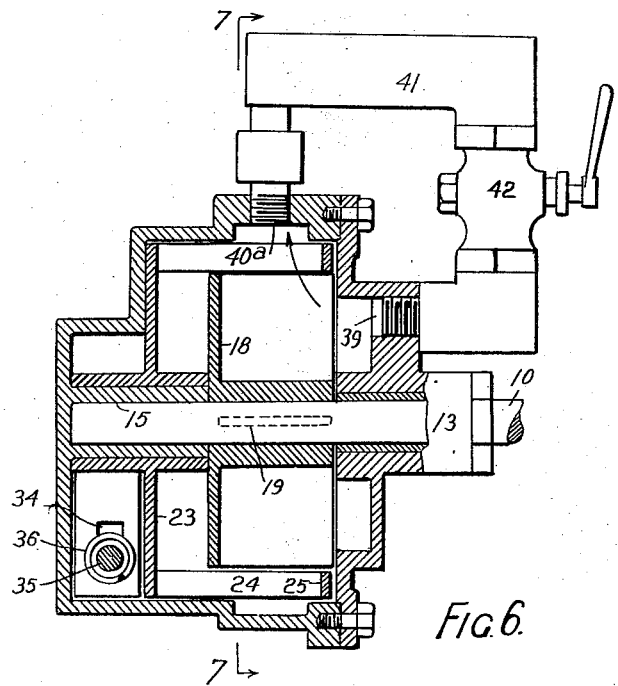
Figure 7:
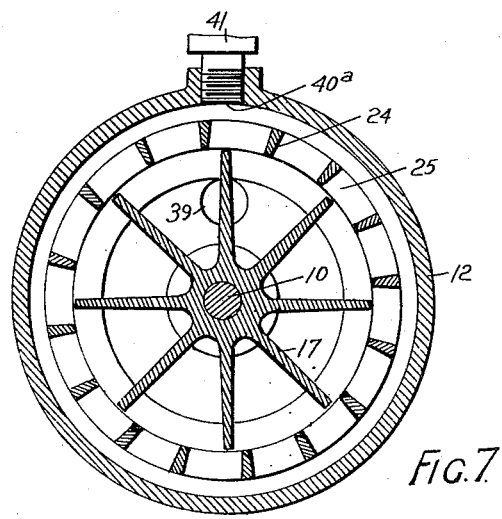

The aforesaid embodiment is illustrated in the annexed drawings wherein Fig. 1 is a perspective view of the governor; Fig. 2 is a perspective view of the two impellers; Fig. 3 is a longitudinal central sectional elevation of the complete governor; Figs. 4 and 5 are sections on lines 4—4 and 5—5 respectively of Fig. 3; Fig. 6 is a sectional elevational of a modification and Fig. 7 is a section on line 7—7 of Fig. 6.

The shaft 10 is connected in any suitable manner to the rotating body, the speed of which is to be controlled by the fluid governor. In Fig. 1 a belt pulley 11 is shown as one example of a connecting means. This shaft 10 passes into a casing 12 through a combination gland and bearing 13 in the casing cover 14. In the casing there is an annular bearing journal 15 in which the end of the shaft is supported.

A driving impeller consisting of a hub 16, vanes 17 and circular back plate 18 is fixed to the shaft 10 as by key 19. The front 20 of the impeller is open.

A driven impeller consists of a hub 21, on which there are radial spokes 22 joined to an annular back plate 23. The radial spokes 22 have lateral vane extensions 24 joined by keeper ring 25. The hub 21 of this driven impeller is rotatably mounted on the annular bearing journal 15.

The lateral vane extensions 24 of the driven impeller constitute a cylindrical vane case in which the driving impeller rotates. The circular back plate 18 of the driving impeller has a driving clearance from the driven impeller radial spokes 22 and the periphery of the driving impeller vanes 17 have a driving clearance from the driven impeller vane lateral extensions 24.

The driven impeller annular back plate 23 has a gear wheel section 26 thereon which is engaged by pinion 27 on pinion shaft 28 mounted in bearing 29 in the casing 12. The pinion shaft 28 projects through the casing 12 and has a crank arm 30 on the projecting end. This crank arm 30 has a series of holes 31 therein to take anchor pin for control rod 32. The several holes provide for a leverage and movement adjustment.

The hub 21 of the driven impeller has a torque arm 33 thereon. This torque arm 33 has a hole 34 in the end thereof through which spring guide rod 35 projects, said spring guide rod being anchored in the casing 12. A helical torque spring 36 on said spring guide rod 35 is adapted to be compressed between the torque arm 33 and an adjusting nut 37 on said rod. Access to this adjusting nut 37 is gained through an opening in the casing 12 which is sealed by nut 38.

There is a fluid inlet 39 to the casing 12 in juxtaposition to the front 20 of the driving impeller and there is a fluid outlet 40 from the casing in juxtaposition to the cavity in the back plate 18 of the driven impeller. A pipe 41 connects the inlet 39 to the outlet 40 and there is control valve 42 in this pipe 41.

The casing 12 and the pipe 41 are filled with a fluid and when the driving impeller is rotated the fluid is activated thereby, to flow through the front 20, out through the peripheral outlets of the vanes 17 into the cavities between the vanes extension 24 of the driven impeller, along said cavities, then inwardly between the radial spokes 22 to the outlet from the annular back plate 23, thence to the outlet 40 and the pipe 41. The flow path of the fluid is indicated by arrows in Fig. 1.

The tendency of the driven impeller to rotate due to the flow of fluid from the driving impeller is resisted by the torque arm 33 bearing against the torque spring 36. If the flow increases beyond a determined amount due to an increase in the speed of the driving impeller the driven impeller rotates sufficiently against the resistance of the torque spring to cause the pinion shaft 28 to partially rotate and thus move the crank arm 30. Such movement is transmitted by the control rod 32 to means controlling the actuation of motive means which in turn actuate the driving impeller shaft and reduce the rate of actuation of the said motive means. If the flow decreases beyond a determined amount the driven impeller is part rotated in the reverse direction by the action of the torque spring 36 thus moving the control rod 32 in the opposite direction so that the rate of actuation of the motive means is increased.

In the modification illustrated in Figs. 6 and 7 the same general arrangement of parts is employed with the exception that the outlet 40a from the casing 12 is in juxtaposition to the lateral vane extensions 24 of the driven impeller. Other minor practical alterations to the structure of the driven impeller will be apparent. The advantage of this modification is that the fluid is not required to flow inwardly against the centrifugal action of the driven impeller.

I claim:

A fluid governor consisting of a shaft connected to the motive means to be controlled, said shaft having a fluid driving impeller thereon with an inlet at the centre and an outlet at the periphery; a driven impeller rotatably free on said shaft having its actuating part projecting over the periphery of the driving impeller; a stationary casing surrounding said impellers; a fluid inlet to said casing in juxtaposition to the driving impeller inlet and an outlet from the casing in juxtaposition to the driven impeller outlet; a pipe connection between the casing inlet and outlet with a valve in said pipe; a torque arm on said driven impeller connected to an adjustable torque spring; a gear on said driven impeller engaging a pinion on a pinion shaft having a connection to the control means whereby the motive means is actuated

JOHN DANIEL SUMMERS.

REFERENCES CITED

The following references are of record in the file of this patent:

UNITED STATES PATENTS

| Number | Name | Date |
|---|---|---|
| 1,411,992 | Doran | Apr. 4, 1922 |
| 1,655,647 | Hornbostel | Jan. 10, 1928 |

FOREIGN PATENTS

| Number | Country | Date |
|---|---|---|
| 572,807 | France | Feb. 28, 1924 |